Jan. 7, 1958 C. KOENIG 2,819,180

SELF-ADHESIVE TAPE

Filed Nov. 4, 1952 2 Sheets-Sheet 1

Inventor:

Claus Koenig

Jan. 7, 1958 C. KOENIG 2,819,180

SELF-ADHESIVE TAPE

Filed Nov. 4, 1952 2 Sheets-Sheet 2

Inventor:

Claus Koenig

United States Patent Office 2,819,180

Patented Jan. 7, 1958

2,819,180

SELF-ADHESIVE TAPE

Claus Koenig, Erlangen, Germany

Application November 4, 1952, Serial No. 318,666

Claims priority, application Germany November 10, 1951

3 Claims. (Cl. 117—11)

Figure 1:
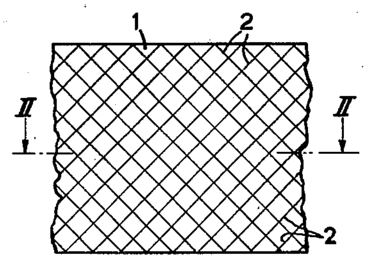

My invention relates to a self-adhesive tape. It is especially intended for tab punches but it can also be applied to other purposes for which self-adhesive tapes are customary, especially to bordering (fastening; sealing) the edges of articles of flat shape such as drawings, papers, envelopes, covers, etc. Self-adhesive shall mean an adhesive tape which keeps its adhesive quality because of the kind of adhesive material used (as a rule an india-rubber material) even if stored for longer times and sticks "by itself" without water or other means being used to make the tape adhesive.

The new self-adhesive tape has the feature of meeting particularly well the requirements and viewpoints in question. Self-adhesive tapes are usually held available in continuous rolls. With regard to the rolling, special measures are required to prevent continuous-surface contact of adjacent layers of the roll. With regard to the space required by the roll both for packing and dispatch and also for its application it is desirable to have on a roll with a given diameter as long a tape as possible. This applies particularly to the self-adhesive tape stocked in a roll in tab punchers and in edge protectors. The greater the length of the strip on a roll the less frequent replacing is required. This point of view leads to the use of as thin a tape as possible. On the other hand the self-adhesive tape shall have a high tensile strength. When used in tab punchers the idea is to reinforce the neighbourhood of the hole punched by the puncher in letter copies and other papers, documents, and the like which shall be filed in such a way that even the thinnest sheets are "punch-proof." Another point of view for using as thin a tape as possible is the fact that it is important not to reduce the number of papers etc. to be stored in a file by the reinforcement of the punched edges more than necessary. In other words the reinforced punched edges shall not take up too much space.

The new self-adhesive tape fulfills the above named requirements.

The tape proper is a foil of plastic material, especially polyvinyl chloride (PVC)—without plasticizer. It has two adhesive coatings extending in the longitudinal direction leaving a non-adhesive middle zone and narrow non-adhesive edge-zones.

Further it has slight indentations for the purpose of preventing continuous surface contact of the adjacent layers when rolling the tape to a roll.

The indentations are made preferably as narrow point indentations, but it may also be made as cross or line indentations as explained below. In the present case the indentations firstly bring about that adjacent layers of the roll have no continuous surface contact, but instead have only contact in dots or along lines. Consequently the layers can easily be separated. The upper surface of the adhesive tape drawn from the roll proves to be free from adhesive material in spite of having been rolled up. The indentations used, however, have another essential advantage. Experience has shown that the adhesive tape often can be rolled up even if there are no indentations. Such an adhesive tape, the layers of which then have a continuous surface contact, is in danger that the adhesive material causes the tape proper to swell. If on the other hand the self-adhesive tape has indentations there are always some air between the individual layers. The result is that the above named swelling does not occur.

The use of two adhesive coatings extending in the longitudinal direction with a non-adhesive middle zone and narrow non-adhesive edge-zones makes—in connection with the other characteristics—this new tape especially suitable for use in tab punchers. With these tab punchers the roll of adhesive tape is kept as a rule on a pin between two disks or the like in the tab puncher. The tape drawn from the roll runs as is explained below between a feed roll and a counter roll. The non-adhesive middle zone offers the necessary non-adhesive working surface to the counter roll. The non-adhesive narrow edge zones prevent the disks serving for holding and guiding the tape to come into contact with adhesive material. Otherwise during use of the roll it would stick to these disks.

Figure 2:
Figure 3:
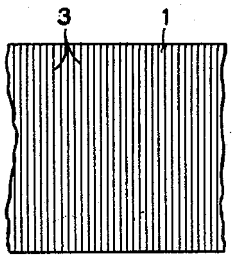
Figure 4:
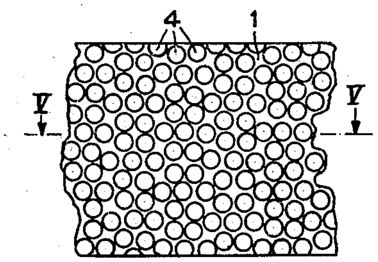
Figure 5:
Figure 10:
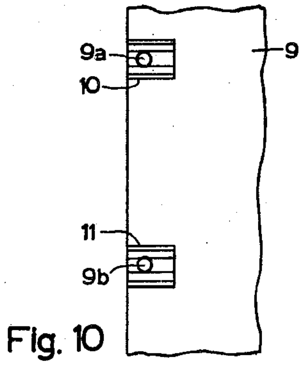
Figure 6:
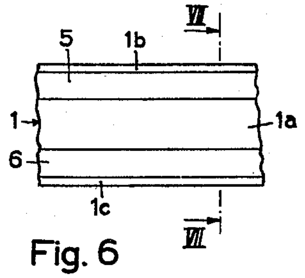
Figure 7:
Figure 8:
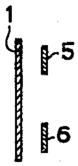
Figure 9:
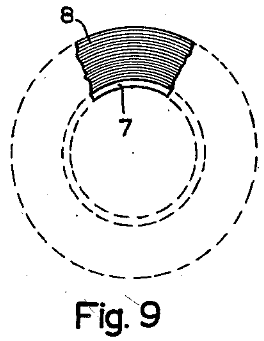
Figure 11:
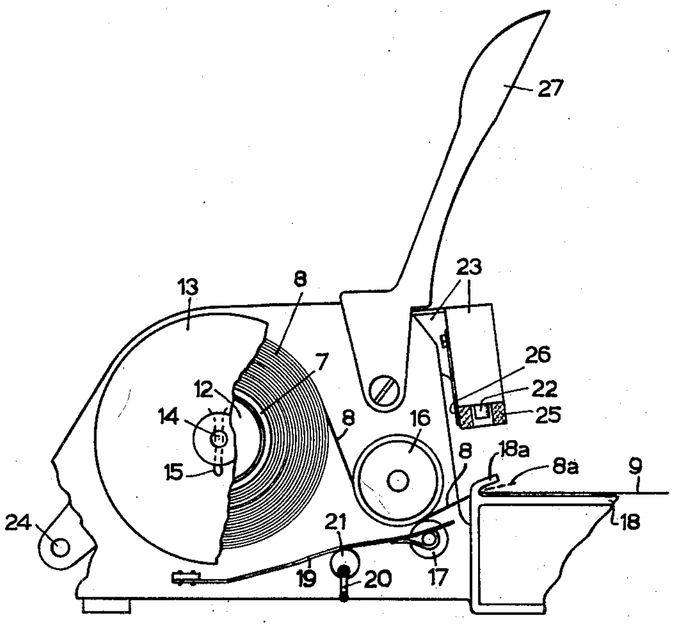
Figure 12:
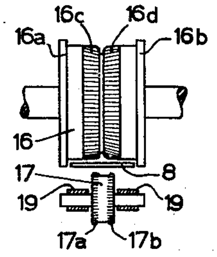

For further explanations reference is made to the drawing which shows several examples how the invention can be realised. It is shown in Fig. 1 a plan view of the tape proper with indentations but without adhesive coating;

Fig. 2 a cross section along the line II—II of Fig. 1;

Fig. 3 a plan view of the tape proper with another kind of indentations,

Fig. 4 a plan view of the tape proper with point indentations,

Fig. 5 a cross section along the line V—V of Fig. 4;

Fig. 6 a plan view of the new self-adhesive tape where however for the sake of clearness the indentations are omitted;

Fig. 7 a cross-section along the line VII—VII of Fig. 6;

Fig. 8 once more the cross-section of Fig. 7 where however for the sake of clearness spaces are left between the tape proper and the two adhesive coatings;

Fig. 9 the self-adhesive tape rolled up;

Fig. 10 a partial view of a punched paper having a reinforced punching zone;

Fig. 11 for better explanation a partial side view of a tab puncher equipped with the new self-adhesive tape;

Fig. 12 the feed roll moving the self-adhesive tape in the tab puncher and the counter roll of the puncher in front view.

In Fig. 1 the tape proper is designated by 1. From this tape the manufacture of the new self-adhesive tape is started. The tape 1 has slight indentations 2 formed by cross indentations diagonal to the longitudinal axis of the tape. Because of this indentation within the individual parallelogram-shaped fields a small tip or, in other words, a small peak is formed.

Fig. 2 attempts to show this for the sake of clearness somewhat exaggerated.

Fig. 3 shows the same tape as Fig. 1 but with the difference that the indentations are formed by lines 3 running across the longitudinal direction of the tape.

Finally Fig. 4 shows a tape having an indentation pattern consisting of narrow point indentations. Thus the tape 1 has slight point-shaped indentations 4. It should be pointed out that it is recommended and that it is sufficient to make these indentations—be it cross indentations 2, line indentations 3, or point indentations 4—only very slight, i. e. with very slight depth. Consequently, the self-adhesive tape retains essentially the look of a plain tape. These slight indentations, however, are sufficient to bring about a surface contact only in lines or points between the adjacent layers of the self-adhesive tape when rolled up. The air between the adjacent layers is not completely removed; any swelling of the tape proper or of its surface zone by the adhesive material is prevented. The tape retains its good qualities even when stored for a longer time. Furthermore it is easy to draw from the roll.

Practical experience has shown that there is no danger that in rolling up the tape the indentations on the one side of the tape will fit exactly into the corresponding indentations of the adjacent layer. Furthermore, there is the possibility to form the indenting rolls or other tools which make the indentations, in such a way that the indentation pattern has a slight irregularity extending over more than the length of a layer. This will prevent—even from a theoretical consideration—the possibility that the indentation "crests" will coincide with the indentation "valleys" of the adjacent layer of the tape.

The material of which the tape proper is made is of high importance. For the new tape a very thin tape of the kind of a thin foil consisting of plastic material is used. Preferably a foil tape is used which is made of PVC or of another plastic based on PVC (for instance a mixed polymeride with PVC). There may be used PVC or PVC products with plasticiser, preferably however PVC or a PVC product without plasticiser.

In following these rules an extraordinary high tensile strength results even for very thin tapes. Especially advantageous for the tape proper was found a tape of PVC (without plasticiser) having a thickness of only 0.05 mm. or even less. This tape of 0.05 mm. thickness when tested showed a mechanical strength especially a tearing strength which considerably exceeded the mechanical strength of a self-adhesive tape made of a really good paper of 0.120 mm. thickness and even exceeded the strength of a good paper tape made of Japanese fibre of 0.112 mm. thickness.

For the new self-adhesive tape even a thin tape (foil tape) made of cellophane (a viscose product) can be used.

The foil of plastic material used for the tape 1 itself is transparent or translucent as a rule. Thus the tape is not felt as a foreign body on the articles to which it is attached e. g. for reinforcing the punching zones or for bordering.

Figs. 6 to 8 show the new self-adhesive tape with the two adhesive coatings extending in the longitudinal direction. The tape proper is again designated by 1, the two adhesive coatings by 5 and 6. To form the coatings 5 and 6, an adhesive material is put onto the tape 1 itself of such kind which remains adhesive for a long time and sticks by itself, without any other means such as water, heat, or the like being required. Preferably a genuine india rubber adhesive material is used. Experience has shown that this material contrary to synthetic adhesive materials has a reliable sufficiently strong adhersion and inner strength. Therefore this adhesive material sticks well and in a homogeneous distribution to its base, i. e. the tape proper 1. Between the two adhesive middle zone **1*a*, and at the edge of the tape there are left narrow non-adhesive edge zones 1*b* and 1*c*. It should be noted with respect to the cross-sections shown in Figs. 7 and 8 that for the sake of clearness the thickness of the tape proper 1 as well as the thickness of the two adhesive coatings or, in other words the two adhesive paths, 5 and 6** are shown exaggerated.

Fig. 9 shows the new self-adhesive tape rolled up. The tape is here rolled on a coil or in other words on a reel 7 made of cardboard or the like. The finished self-adhesive tape is designated by 8 in Fig. 9 and in the following figures.

Fig. 10 shows the application of the new self-adhesive tape for re-inforcing the edge zones of the punch holes of letter copies and other papers. The paper sheet itself is designated by 9 in Fig. 10. It is punched at **9*a* and 9*b* in the usual manner. The edge zones of these two punch holes 9*a* and 9*b* are reinforced by a piece 10 and 11** of the new self-adhesive tape.

The special conditions with which the self-adhesive tape must comply when used in tab punchers are clarified if the tab puncher itself is now discussed in short.

Figs. 11 and 12 show the essential parts to be considered here. The tab puncher has a pin 12 on one side wall to take up the self-adhesive tape roll 7, 8 (see Fig. 9). The diameter of the pin 12 is somewhat smaller than the inside diameter of the reel 7 of the self-adhesive tape roll, so that the roll can easily turn on the pin 12. The roll 7, 8 when put in place is kept there by a circular disk 13 which is kept in its position on a bolt 14 on the pin 12 by a fixture which is easily detachable in the kind of a patent-fastener. The spring pin belonging to this fixture is designated by 15.

The self-adhesive tape drawn from the roll 7, 8 is led through between the feed roll 16 and the counter roll 17 in such a length that the free end of the tape 8 touches the board 18 in a somewhat sledged position. The counter roll 17 is held by its shaft by means of a flat spring 19 which is fixed with its other end on the side wall of the tab puncher. A hand lever 20 pivoted at the same side wall and an excentric disk 21 connected with it permits the counter roll 17 to be engaged or disengaged with the feed roll 16. When the starting end of the tape is filed in the counter roll 17 is disengaged from the roll 16 by operating the hand lever 20. After the tape 8 has been put around the feed roll 16, the counter roll 17 is brought into the working position shown in Fig. 11.

The sheet of paper which is to be punched and at the same time to be reinforced in the punching zones is put into the table 18 in such a manner that the edge to be punched rests against the stops **18*a* of the table 18. The sheet to be punched is designated by 9 like in Fig. 10. The punches of which Fig. 11 only shows one punch 22 are fixed on a lever 23, which can be moved around the shaft 24. This shaft is fixed or has its bearings on the side-walls of the tab puncher. Caused by a spring not shown in the drawing the lever 23 assumes the rest position shown in Fig. 11. The punch 22 is surrounded by an easily compressible ring of rubber 25 which is fixed to the lever 23 and serves to press the end of the tape 8 against the sheet 9 which is to be punched and to be reinforced in the punching zones. Furthermore a knife 26 is attached to the parts 22 and 25. It serves to cut off at each operation the front end of the tape 8 used for reinforcement. The parts shown follow repeatedly corresponding to the number of punches. If the tab puncher of Fig. 10 has to make only 2 punch holes in the sheet 9, the parts 7, 8, 12, 16, 17, 22, 25, 26 and the other parts required shown in Fig. 11 are repeated on the other side of the tab puncher. The named parts can likewise be repeated in the middle plane of the tab puncher so that the sheet 9** to be punched in this case gets three holes with three reinforcements in the three punching zones.

The lever 23 is turned from the rest position shown into its working position by means of a hand lever 27 which is pivoted at the side walls of the tab puncher. The feed roll is coupled to the lever 23 by means of a gear which operates step-by-step so that it moves forward the tape 8 at each pressing-down of the lever 23 by the length of the reinforcing tabs 10 and 11 (see Fig. 10). It was mentioned above that in the rest position of the lever 23 the free end of the tape 8 just touches the board 18. When the lever 27 is pressed down and thereby the lever 23 moves downward the feed roll 16 is turned to such an extent that the free end of the tape 8 is moved forward into the position shown at **8*a* as a dotted line. Shortly thereafter the rubber piece 25 comes into contact with the end 8*a* of the self-adhesive tape 8 and presses it against the sheet 9. When the lever 23 moves down further the rubber piece 25 is compressed. The punch 22 punches the hole 9*b* (see Fig. 10) in the sheet 9 and in the reinforcing tab that has been put on meanwhile. At the same time the knife 26 cuts off the reinforcing tab of the tape 8** which has been put on to the sheet. The same sequence of operations occurs at the same time on the other feed rolls, punches, etc. depending on the design whether the tab puncher is equipped with two, three or four punches. As a rule two or three punches are sufficient.

From Fig. 12 can be seen that the feed roll 16 is provided with two flanges 16*a* and 16*b* at its sides for guiding the tape 8 while in the middle zone there are two somewhat bevelled toothings 16*c* and 16*d*. These toothings work in combination with the two toothings 17*a* and 17*b* at the sides of the counter roll 17. The self-adhesive tape is designated as 8 in Fig. 12. For the sake of clearness the counter roll is shown disengaged from the feed roll 16 or from the tape 8 respectively which lies between the two rolls. When the roll 17 is pressed against the feed roll 16 the tape 8 is caught between the toothings 16*c* and 16*d* and the counter toothings 17*a* and 17*b* of the counter roll 17 and moved forward with the step movements of the feed roll 16 in the manner stated above. The effective length of the counter roll 17 is chosen so that the toothings 17*a* and 17*b* engage at the non-adhesive middle zone (see 1*a* in Fig. 6). Consequently the counter roll 17 remains free from adhesive material. There is no smearing of the gear moving the tape. Likewise the narrow non-adhesive edge zones (see 1*b* and 1*c* in Fig. 6) bring about that the self-adhesive tape 8 is free from adhesive material at the edges and in the rolled up tape at the side faces of the roll so that even the side guidings for the roll 7, 8 (see Fig. 11) remain free from adhesive material. Thus it is prevented in a reliable manner that the self-adhesive tape perhaps gradually comes to stick to the side guidings, for instance to the circular disk 13 (see Fig. 11).

It has been mentioned above that the Figs. 11 and 12 are given in order to show the special requirements which must be fulfilled by the new self-adhesive tape when used in tab punchers. With reference to Figs. 11 and 12 and the explanations given the following will be understood the better. For a good reliable operation of the tab puncher it is necessary that the self-adhesive tape can be drawn easily from the tape roll. This requirement is fulfilled with the new self-adhesive tape: because of the indentations explained above the adjacent layers of the tape roll have contact only at individual points. The tape therefore is easily drawn off. Thus there is no slipping of the tape 8 between the feed roll 16 and the counter roll 17. Furthermore from the Figs. 11 and 12 is to be seen that the tape 8 should be as resistant to tearing as possible even with regard to the feeding movement and the stresses encountered when passing through the rolls 16 and 17. The same requirement must be fulfilled also in order to get a real protection against tearing of the edge zones near the punched holes in the reinforced sheet. As stated above, the plastic material used for the self-adhesive tape has a high mechanical strength especially against tearing. On account of the extraordinarily small thickness of the new self-adhesive tape—as stated above for the preferred type a thickness of only about 0.05 mm. is used—a very large tape length can be stored in the tape roll; therefore a tab puncher equipped with such rolls is usable for a much longer time before the tape rolls must be replaced.

Since different embodiments of the invention may be made and certain changes may be made in the description without departing from the spirit and scope of the invention, it is intended that all the matter contained in the above description shall be construed as illustrative and not in a limiting sense.

I claim:

1. A roll of self-adhesive tape adapted for use in a friction roller feed tab cutting machine, comprising a rolled-up foil tape of non-adhesive plastic having a pattern of slight indentations covering the entire tape surface to prevent continuous area contact between adjacent layers of tape in the roll, two strip-shaped coatings of self-adhesive material on one side only of said tape, said coatings extending parallel to each other in the longitudinal direction of the tape and leaving a non-adhesive middle zone between each other, said middle zone having no transverse perforations, said middle, indented, non-adhesive zone serving as a friction trackway for friction roller feed means of the tab cutting machine, and said coatings being transversely spaced from the respective longitudinal edges of the tape to leave respective non-adhesive edge zones of smaller width than said middle zone to prevent sticking in said machine.

2. A roll of self-adhesive tape adapted for use in a friction roller feed tab cutting machine, comprising a rolled-up foil tape of non-adhesive polyvinyl chloride polymer plastic having a thickness no greater than about 0.05 mm. having a pattern of slight indentations covering the entire tape surface to prevent continuous area contact between adjacent layers of tape in the roll, two strip-shaped coatings of self-adhesive material on one side only of said tape, said coatings extending parallel to each other in the longitudinal direction of the tape and leaving a non-adhesive middle zone between each other, said middle zone having no transverse perforations, said middle, indented, non-adhesive zone serving as a friction trackway for friction roller feed means of the tab cutting machine, and said coatings being transversely spaced from the respective longitudinal edges of the tape to leave respective non-adhesive edge zones of smaller width than said middle zone to prevent sticking in said machine.

3. A roll of self-adhesive tape adapted for use in a friction roller feed reenforcing tab cutting machine, comprising a rolled-up foil tape of non-adhesive unplasticized polyvinyl chloride polymer plastic having a thickness no greater than 0.05 mm. and having a pattern of indentations covering the entire tape surface to prevent continuous area contact between adjacent layers of tape in the roll, two strip-shaped coatings of self-adhesive India rubber material on one side only of said tape, said coatings extending parallel to each other in the longitudinal direction of the tape and leaving a non-adhesive middle zone between each other, said middle zone having no transverse perforations, said middle, indented, non-adhesive zone serving as a friction trackway for friction roller feed means of the tab cutting machine, and said coatings being transversely spaced from the respective longitudinal edges of the tape and leaving respective non-adhesive edge zones of smaller width than said middle zone to prevent sticking in said machine.

References Cited in the file of this patent

UNITED STATES PATENTS

| | | |
|---|---|---|
| 2,086,126 | Gilchrist | July 6, 1937 |
| 2,322,310 | Muskat et al. | June 22, 1943 |
| 2,332,265 | Schmidt | Oct. 19, 1943 |
| 2,373,634 | Wagner | Apr. 10, 1945 |
| 2,393,863 | Myers | Jan. 29, 1946 |
| 2,500,549 | Ketay et al. | Mar. 14, 1950 |